(12) United States Patent
Witte et al.

(10) Patent No.: US 8,121,810 B2
(45) Date of Patent: Feb. 21, 2012

(54) METHODS FOR REDUCING THE RECEIPT OF MULTIPLE SIGNALS IN A PORTABLE INFORMATION HANDLING SYSTEM

(75) Inventors: Kendall C. Witte, Austin, TX (US); Loren R. Fredlund, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 463 days.

(21) Appl. No.: 12/395,621

(22) Filed: Feb. 27, 2009

(65) Prior Publication Data

US 2010/0223026 A1 Sep. 2, 2010

(51) Int. Cl.
*G06F 1/32* (2006.01)
(52) U.S. Cl. .......... 702/150; 702/176; 713/320
(58) Field of Classification Search .......... 702/150, 702/176, 178, 187, 189; 713/300, 320, 323, 713/324
See application file for complete search history.

(56) References Cited

U.S. PATENT DOCUMENTS

| 6,243,819 | B1 * | 6/2001 | Jung ............ 713/320 |
| 6,957,174 | B2 | 10/2005 | Wall |
| 2006/0025960 | A1 | 2/2006 | Wall |
| 2008/0089260 | A1 * | 4/2008 | Tsukamoto et al. .......... 370/311 |

* cited by examiner

*Primary Examiner* — Manuel L Barbee
(74) *Attorney, Agent, or Firm* — Garrana Tran LLP; Andrea E. Tran

(57) ABSTRACT

A method for reducing the receipt of multiple signals in a portable information handling system (IHS) is closed including receiving a first signal corresponding to a detected lid position of the portable IHS. The method further includes determining if a first predetermined amount of time has elapsed and if the first predetermined amount of time has not elapsed, preventing the receipt of an additional signal corresponding to a change in the detected lid position. Further, a portable information handling system may include a lid, a base coupled to the lid and a sensor disposed on the lid or base, wherein the sensor detects a lid position. The system further includes a processor coupled to the sensor, wherein the processor generates a first signal corresponding to the lid position and the processor is operable to generate an additional signal corresponding to a change in the lid position.

20 Claims, 3 Drawing Sheets

METHODS FOR REDUCING THE RECEIPT OF MULTIPLE SIGNALS IN A PORTABLE INFORMATION HANDLING SYSTEM

TECHNICAL FIELD

The present disclosure relates generally to the field of information handling systems, and, more specifically, to reducing the receipt of multiple signals in portable information handling systems.

BACKGROUND

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems (IHSs), herein referred to as portable IHSs, may be provided in a portable housing which allows the IHS to be easily transported. For instance, portable IHSs may include laptops, portable disk players, handheld devices, or the like. A portable IHS may include a sensor that detects when the lid or cover is in an open or closed position. The lid of a portable IHS may sometimes be left slightly open, which may cause a lid sensor to bounce or generate false reports about the open/close position of the lid. Each time the lid position changes, a message may be sent to the operating system (OS) to perform a series of operations in response to the message. These series of operations may include communication among various components such as a video driver, the basic input/output system (BIOS), the OS or the like. For instance, in the event that lid position changes, the BIOS may signal the OS to place the portable IHS into a hibernation mode. When the lid sensor bounces causing multiple signals to be sent to the OS, the signals may adversely affect system operations, such as causing the system to hang (i.e., freeze or lock up).

Thus, a need exists for methods to improve system operations during fluctuations in lid position. By utilizing dual timing methods, frequent changes in the open/close position may be managed properly without causing system inoperability while still maintaining a fast response to a change in the lid position.

SUMMARY

The following presents a general summary of several aspects of the disclosure in order to provide a basic understanding of the disclosure. This summary is not an extensive overview of the disclosure nor is it intended to identify key or critical elements or to delineate the scope of the claims. The following summary merely presents some concepts of the disclosure in a general form as a prelude to the more detailed description that follows.

One aspect of the disclosure provides a method for reducing the receipt of multiple signals in a portable information handling system (IHS). The method includes receiving a first signal corresponding to a detected lid position of the portable HIS and determining if a first predetermined amount of time has elapsed. If the first predetermined amount of time has not elapsed, the method includes preventing the receipt of an additional signal corresponding to a change in the detected lid position.

Another aspect of the disclosure provides a computer-readable medium having computer-executable instructions for performing a method for reducing the receipt of multiple signals in a portable information handling system (IHS). The method includes receiving a first signal corresponding to a detected lid position of the portable HIS and determining if a first predetermined amount of time has elapsed. If the first predetermined amount of time has not elapsed, the method includes preventing the receipt of an additional signal corresponding to a change in the detected lid position Yet another aspect of the disclosure provides a portable information handling system which may include a lid, a base coupled to the lid and a sensor disposed on the lid or base, wherein the sensor detects a lid position. The system further includes a processor coupled to the sensor, wherein the processor generates a first signal corresponding to the lid position. Moreover, the processor is operable to generate an additional signal corresponding to a change in the lid position.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present methods are described, it is to be understood that this disclosure is not limited to the particular methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "a signal" may refer to one or several signals, and reference to "a method of processing" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
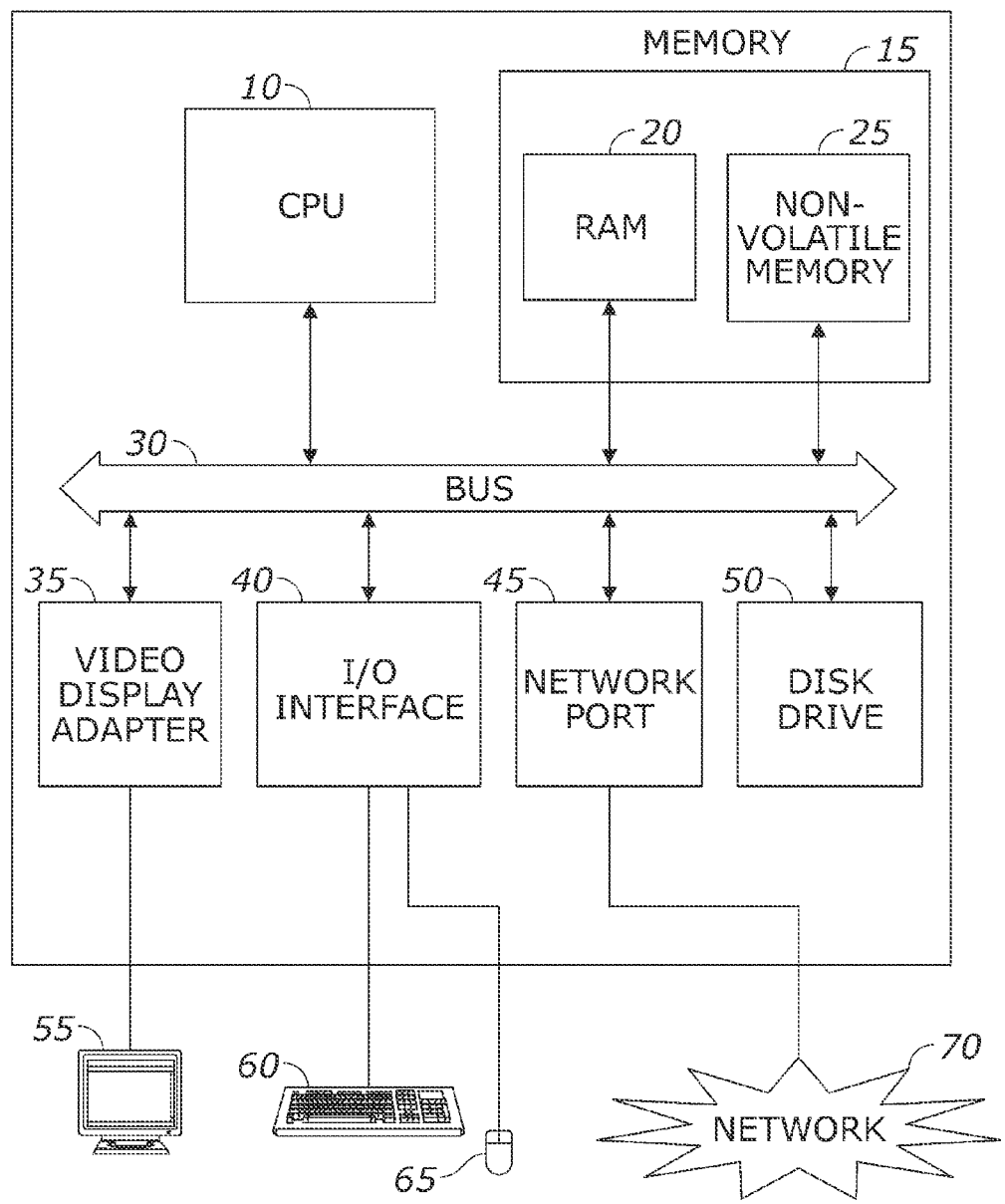
FIG. 1 represents an illustrative schematic of an information handling system (IHS) in accordance with one aspect of the disclosure.

FIG. 1 illustrates one possible implementation of an IHS 5 comprising a CPU 10. It should be understood that the present disclosure has applicability to IHSs as broadly described herein, and is not intended to be limited to the IHS 5 as specifically described. The CPU 10 or controller may comprise a processor, a microprocessor, minicomputer, or any other suitable device, including combinations and/or a plurality thereof, for executing programmed instructions. The CPU 10 may be in data communication over a local interface bus 30 with components including memory 15 and input/output interfaces 40. The memory 15, as illustrated, may include non-volatile memory 25. The non-volatile memory 25 may include but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS), which primary identifies and/or initializes system hardware components such as a hard disk drive, floppy disk drive, video card and the like. The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
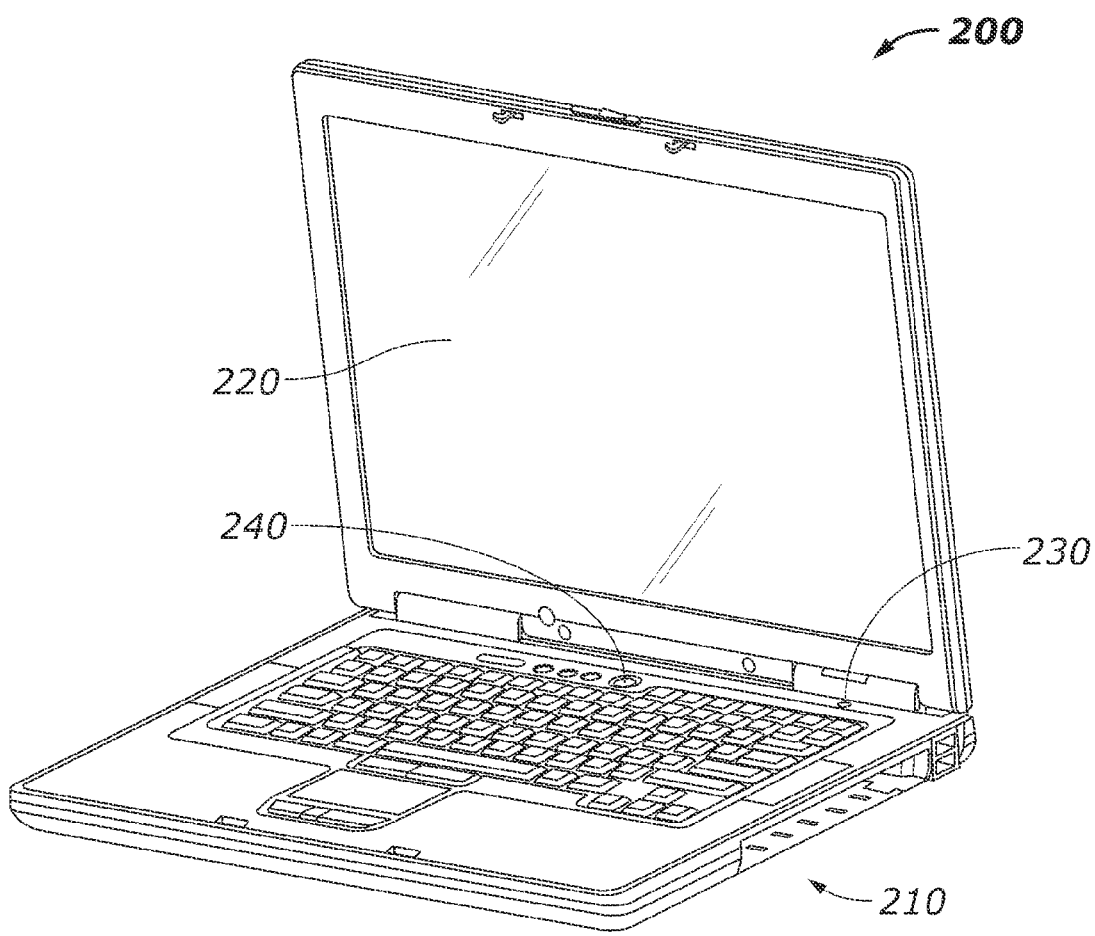
FIG. 2 represents an illustrative schematic of a portable IHS in accordance with another aspect of the disclosure.

FIG. 2 provides an illustrative schematic of a portable IHS indicated generally at 200. A portable IHS 200 may provide some or all of the basic functionality of an IHS in a portable housing. As shown, the portable IHS 200 may include a base 210 and a cover or lid 220. The lid 220 may provide a display 250, such as a liquid crystal display (LCD) or any other suitable flat panel display. A base 210 may provide several input/output (I/O) devices, such as a keyboard 205 and touchpad, and may house several key components of an IHS such as a CPU, RAM, a hard disk, and other components.

The lid 220 may be coupled to a base 210 by a hinge or any suitable mechanism that allows the lid 220 to be moved from an open position to a closed position and vice versa. In an open position, as shown, a display 250 disposed on the lid 220 may be visible and the keyboard 205 or the like on the base 210 may allow a user to operate the portable IHS 200. In a closed position, the lid 220 may be pivoted to lie atop the base 210 with the display 250 in a downward facing position on the base 210. In another example of a closed position, the lid 220 may be secured atop the base 210 by a securing member (i.e., latch or a mechanical spring loaded button) so as to prevent the lid from being moved into an open position without the release of the securing member.

The base 210 or lid 220 of the portable IHS 200 may provide a mechanical or magnetic sensor 230 that detects lid position, i.e., whether the lid 220 is in an open or closed position. In one implementation, the sensor may comprise a spring loaded element (e.g., button) to detect the lid 220 in a closed position upon compression of the element and alternatively, an open position upon release of the element. In another implementation, a sensor 230 in the base 210 may detect the proximity of a magnet embedded within the lid 220 to detect the closed position. Alternatively, the failure of the sensor 230 to detect the magnet signifies the lid being in an open position. A processor, such as an embedded controller (EC) within the base 210 and communicatively coupled to the sensor, may generate a software message (i.e., signal) in response to a detected lid position, either in an open or closed position. The detected lid position may correspond to an actual lid position, i.e., open or closed position as detected by the sensor. In other implementations, a user may place the lid 220 in a slightly open position that may cause the sensor 230 to detect fluctuations between an open and closed position. The processor may further sense a change in the detected lid position (e.g., from open to closed position) and generate an additional or multiple signals (i.e., software messages) to report the latest status or position of the lid to the OS. By way of illustration, if an initial signal is generated when the sensor detects the lid in the closed position, a subsequent signal may be generated when the sensor detects that the lid position has changed, i.e., is now in the open position.

The IHS OS may perform a single or multiple operations in response to a single or multiple signals reporting the lid status. In some cases, these operations may be set or defined within an OS by a user. For instance, a menu provided by the OS may allow the user to select from shutting down, going to standby mode, or staying in a normal mode when the lid 220 is in a closed position. Rapid or repeated changes in the open/closed position detected by the sensor 230 in the lid 220 may cause the portable IHS 200 to attempt to switch or toggle between different modes of operation. As a result, the OS of the portable IHS may enter an undesired mode (e.g., hang or freeze up) thereby causing user dissatisfaction.

Figure 3:
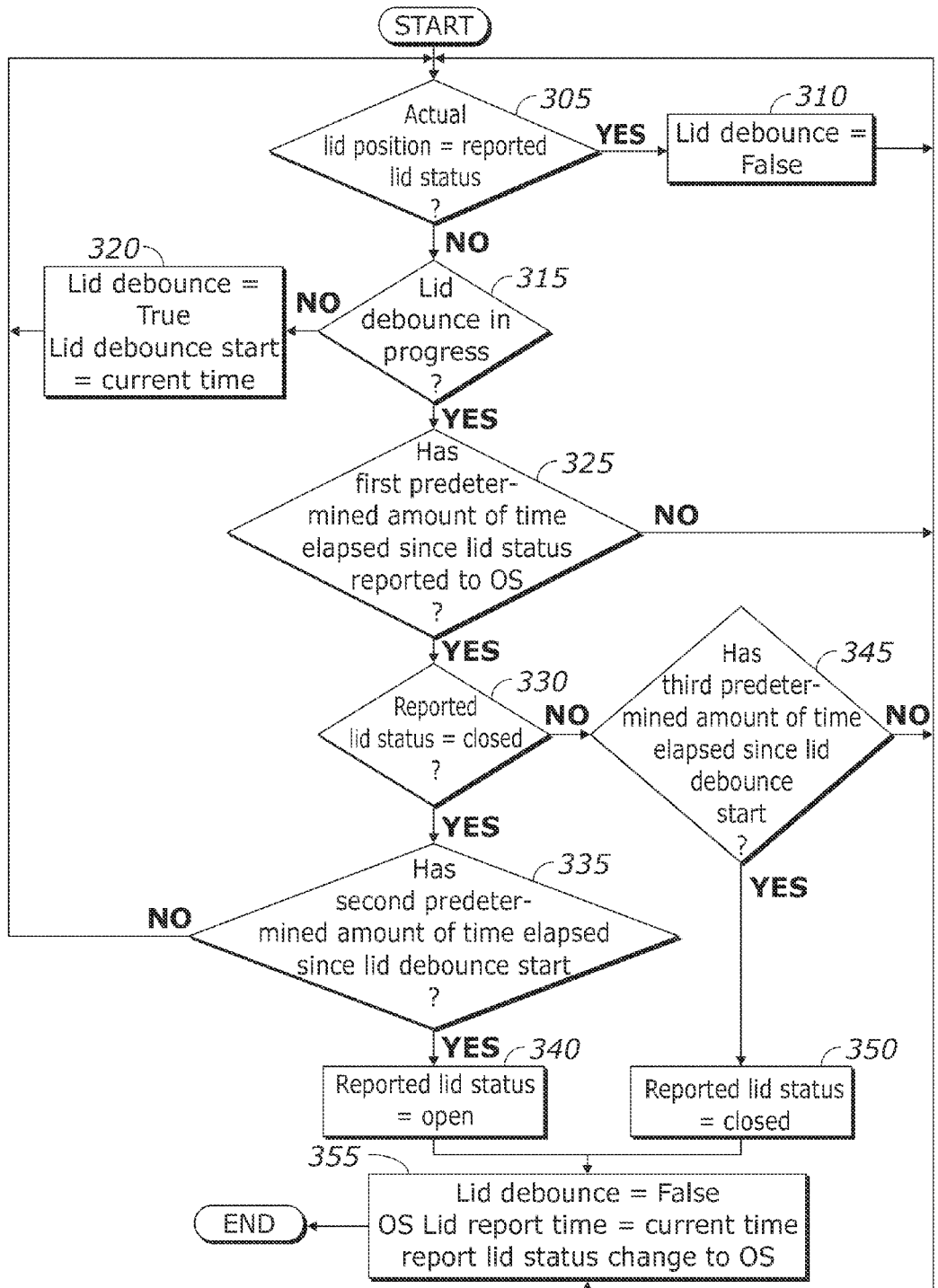
FIG. 3 represents an illustrative flow diagram for a debounce method in accordance with yet another aspect of the disclosure.

In order to prevent problems caused by a sensor detecting fluctuations between an open and closed position, a dual timing method may be utilized to debounce or mitigate the effects of the repeated changes or fluctuation(s) in lid position reported by the lid sensor. FIG. 3 provides a flow diagram representing an implementation of a dual timing method indicated generally at 300. The dual timing method 300 begins by checking the actual position (e.g., open or closed) of the lid detected by a lid sensor and determining if it differs from a reported lid status in step 305. The actual position detected by a lid sensor may represent the detected lid position. A reported lid status, however, may indicate the lid position last reported to the OS. In some cases, such as when the lid position is changing from an open position to a closed position or vice versa, the reported lid status may be different from the position detected by the lid sensor, i.e., the actual position.

In some cases, the actual position detected by a lid sensor may be the same as the reported lid status. If it is determined that the actual position is the same as the reported lid status, the portable IHS may record that there is no lid debounce in progress by setting the lid debounce flag to "false" in step 310 and returning to step 305. As such, the lid debounce flag servers as an indicator that a lid debounce is in progress. In the event that the open/closed position and the last lid status reported to the OS differ, a lid debounce flag may be checked to determine if a lid debounce is in progress in step 315. A lid debounce flag may indicate a change in a pending/potential lid position. The lid debounce flag is true when the actual lid status differs from the status last reported to the OS, i.e., the lid debounce flag is set to true if there is a potential change in lid position. If the lid debounce flag indicates that there is no potential change (i.e., lid debounce flag=false), then the lid debounce flag may be set to "true" and the lid debounce start time may be set to the current time in step 320 before returning to step 305.

As used herein, the "current time" may be an indicator of real time whereas "debounce start time" may indicate the time in which the measure of duration of debounce begins. Thus, in the case mentioned above, if the lid debounce start time is set to the current time, the duration of debounce is initially set to zero, with the eventual duration of debounce being measured by the difference between the debounce start time and the current time.

If the lid debounce flag indicates that there is a potential change (i.e., lid debounce flag=true), then a check is performed to determine if two seconds have elapsed since the lid position was last reported to the OS in step 325. For instance, an OS lid report time indicating when the lid position was most recently reported to the OS may be compared to the current time to determine if two seconds have elapsed. The predetermined amount of time (e.g., 2 seconds) specified in step 325 may represent the minimum amount of time needed in between reporting changes in the lid position to the OS to prevent the OS from crashing or hanging. If two seconds has not elapsed since the lid position was last reported to the OS, then the method may return to step 305. If two seconds has elapsed, then a check is performed to determine if the reported lid status indicates that the lid is closed in step 330.

If the reported lid status indicates that the id is initially in a closed position, then a check may be made to determine if 200 milliseconds has elapsed since the actual lid position changed in step 335. For instance, a lid debounce start time indicating when the actual lid position changed may be compared to a current time to determine the amount of time that has elapsed. The check in step 335 may prevent a change in the actual lid position detected by the lid sensor from being reported to the OS if the lid is in the open position for less than a first predetermined period of time specified. If 200 milliseconds does not elapse, the method may return to step 305. If 200 milliseconds elapses, the reported lid status may be set to open in step 340.

If the reported lid status indicates that the lid is initially in an open position, it is then determined if a second predetermined period of time (e.g., 2.5 seconds) has elapsed since the actual lid position changes to a closed position in step 345. The check in step 345 may prevent a change in actual lid position detected by the lid sensor from being reported to the OS if the lid is closed for less than a second predetermined period of time specified. In the present case, if 2.5 seconds does not elapse, the method may return to step 305. However, if 2.5 seconds elapses, then the reported lid status may be set to a closed position in step 350. Once the reported lid status is established in step 340 or step 350, the lid debounce flag may be set to false, the OS lid report time may be set to the current time, and the lid position detected by the sensor is reported to the OS in step 355. To report lid status to the OS, a routine (e.g., code) in the OS is invoked or executed to instruct the OS to query the lid status. The response to the OS lid status query, i.e., open or closed position, is remembered as the last lid status reported to the OS. Once step 355 is complete, the dual timing method 300 may return to step 305.

While several periods of time may have been provided for the dual timing method 300, such as in steps 325, 335, and 345, any suitable time period may be substituted. For instance, the two seconds in step 325 may represent the minimum amount of time that should pass before reporting the lid position to the OS again to prevent fluctuating changes to the lid position causing the OS to hang. The amount of time required may depend on the OS, the settings for the OS, and/or various other factors in the IHS. For Microsoft Windows XP, for example, the amount of time that should elapse in step 325 may be greater than or equal to 1.5 second. However, for an IHS with a different OS, settings, and/or components, the amount of time may vary. The 200 milliseconds in step 335 and the 2.5 seconds in step 345 may prevent bounce in the lid sensor while still quickly reporting the lid position to the OS. This may prevent the lid sensor from reporting fluctuations in the lid position and sending multiple signals to the OS while maintaining an unnoticeable lag in the amount of time that passes from the lid being opened to illuminating the display. In other implementations, the period of time indicated in step 335 may be modified to at least 10 milliseconds and less than or equal to 500 milliseconds. Further, the period of time indicated in step 335 may be modified to a value greater than or equal to 1.5 seconds in other implementations. As discussed previously, these times are based on a portable IHS utilizing Microsoft Windows XP and may vary for IHSs utilizing different operating systems, settings, and the like.

The dual timing method 300 may essentially provide several debounce occurrences. First, the methods presented herein may debounce changes in the lid position detected by the lid sensor in the IHS. Second, the methods may also prevent software debounce by preventing fluctuations in the lid position from being reported to an OS. A change in the lid position may possibly be reported to the OS when the lid sensor remains stable for a predetermined period of time. The features described herein may allow the dual timing method to prevent fluctuations in the lid position from causing multiple signals to be received within an IHS. Reducing the receipt of multiple signals by the system or OS may reduce the occurrence of hanging by the IHS or OS.

Various methods are contemplated including all or less than all of the steps described herein and/or mentioned above, any number of repeats or any of the steps shown and/or mentioned above, and performance of the steps in any order.

Methods of the present disclosure may be presented in terms of logic, software or software implemented aspects typically encoded on a variety of storage media or storage medium including, but not limited to, computer-readable storage medium/media, machine-readable storage medium/media, program storage medium/media or computer program product. Such storage media may be handled, read, sensed and/or interpreted by an IHS. Those skilled in the art will appreciate that such storage media may take various forms such as cards, tapes, magnetic disks (e.g., floppy disk or hard drive) and optical disks (e.g., compact disk read only memory ("CD-ROM") or digital versatile disc ("DVD")). Storage media disclosed herein may not include transitory elements, such as wires used to transmit signals, for example. The disclosure may further be described in the general context of a computer-executable instruction, such as a program module, being executable by an IHS. Generally, a computer-executable instruction or program module may include a routine, program, code, script, object, data structures and the like. It should be understood that the given implementations are illustrative only and shall not limit the present disclosure.

Particular embodiments and/or implementations of the present disclosure have been described in detail. However, the present disclosure is not limited to these embodiments and/or implementations, and it is understood by one skilled in the art that various other embodiments and/or implementations are possible within the scope of the present disclosure. Thus, modifications and variations may be made without departing from the spirit and scope of the claimed subject matter in the present disclosure. Such changes in form and detail, including use of equivalent functional and/or structural substitutes for elements described herein, fall within the scope of the appended claims and are intended to be covered by this disclosure.

What is claimed is:

1. A method for reducing the receipt of multiple signals in a portable information handling system (IHS), the method comprising:
    (a) receiving, by a sensor in a lid of the portable IHS, a first signal corresponding to a detected lid position of the portable IHS;
    (b) comparing, by the portable IHS, the detected lid position of the portable IHS to a reported lid status, wherein the reported lid status indicates the lid position of the portable IHS last reported to an operating system (OS) of the IHS;
    (c) if the detected lid position differs from the reported lid status, determining if a first predetermined amount of time has elapsed; and
    (d) if the first predetermined amount of time has not elapsed, preventing the receipt of an additional signal corresponding to a change in the detected lid position.

2. The method of claim 1, wherein the first predetermined amount of time is greater than or equal to 1.5 seconds.

3. The method of claim 1 further comprising:
    determining if the detected lid position is equal to a reported lid status, wherein the reported lid status corresponds to the detected lid position reported to an operating system (OS).

4. The method of claim of claim 3 further comprising:
    setting a start time equal to the current time prior to determining if a first predetermined amount of time has elapsed.

5. The method of claim 1 further comprising:
    determining if the reported lid position is a closed position if the first predetermined amount of time has elapsed.

6. The method of claim 5 further comprising:
    determining if a second predetermined amount of time has elapsed if the reported lid position is a closed position; and
    repeating steps (a)-(c) if the second predetermined amount of time has not elapsed.

7. The method of claim 6, wherein the second predetermined amount of time is greater than or equal to 200 milliseconds.

8. The method of claim 5 further comprising:
    determining if a third predetermined amount of time has elapsed if the reported lid position is not a closed position; and
    repeating steps (a)-(c) if the second predetermined amount of time has not elapsed.

9. The method of claim 7, wherein the third predetermined amount of time is greater than or equal to 2.5 seconds.

10. A computer-readable storage medium having computer-executable instructions for performing a method for reducing the receipt of multiple signals in a portable information handling system (IHS), the method comprising:
    (a) receiving a first signal corresponding to a detected lid position of the portable IHS;
    (b) comparing the detected lid position of the portable IHS to a reported lid status, wherein the reported lid status indicates the lid position of the portable IHS last reported to an operating system (OS) of the IHS;
    (c) if the detected lid position differs from the reported lid status, determining if a first predetermined amount of time has elapsed; and
    (e) if the first predetermined amount of time has not elapsed, preventing the receipt of an additional signal corresponding to a change in the detected lid position.

11. The computer-readable storage medium of claim 10, wherein the first predetermined amount of time is greater than or equal to 1.5 seconds.

12. The computer-readable storage medium of claim 10 having further computer-executable instructions for the method comprising:
    determining if the detected lid position is equal to a reported lid status, wherein the reported lid status corresponds to the detected lid position reported to an operating system (OS).

13. The computer-readable storage medium of claim 12 having further computer-executable instructions for the method comprising:
    setting a start time equal to the current time prior to determining if a first predetermined amount of time has elapsed.

14. The computer-readable storage medium of claim 10 having further computer-executable instructions for the method comprising
    determining if the reported lid position is a closed position if the first predetermined amount of time has elapsed.

15. The computer-readable storage medium of claim 14 having further computer-executable instructions for the method comprising:
    determining if a second predetermined amount of time has elapsed if the reported lid position is a closed position; and
    repeating steps (a)-(c) if the second predetermined amount of time has not elapsed.

16. The computer-readable storage medium of claim 15, wherein the second predetermined amount of time is greater than or equal to 200 milliseconds.

17. The computer-readable storage medium of claim 14 having further computer-executable instructions for the method comprising:
    determining if a third predetermined amount of time has elapsed if the reported lid position is not a closed position; and
    repeating steps (a)-(c) if the second predetermined amount of time has not elapsed.

18. The computer-readable storage medium of claim 16, wherein the third predetermined amount of time is greater than or equal to 2.5 seconds.

19. A portable information handling system (IHS) comprising:
    a lid;
    a base coupled to the lid;
    a processor; and a sensor disposed on the lid or base, wherein the sensor detects a lid position and generates a corresponding signal indicating a detected lid position received by the processor, the processor compares the detected lid position to a reported lid status, wherein the reported lid status indicates a lid position last reported to an operating system (OS) stored on the IHS, and if the detected lid position differs from the reported lid status, the processor determines whether a first predetermined amount of time has elapsed and if the first predetermined amount of time has not elapsed, prevents the receipt of an additional signal corresponding to a change in the detected lid position.

20. The system of claim 19, wherein the sensor comprises a spring loaded element to detect the lid in a closed position upon compression of the spring loaded element or an open position upon release of the spring loaded element.

* * * * *